United States Patent [19]

Imamura et al.

[11] Patent Number: 4,635,489

[45] Date of Patent: Jan. 13, 1987

[54] STARTER WITH PLANETARY GEAR TYPE SPEED REDUCING MECHANISM

[75] Inventors: Tetsuo Imamura; Yasuaki Yukawa, both of Toyoake, Japan

[73] Assignee: Nippondenso Co., Ltd., Kariya, Japan

[21] Appl. No.: 779,684

[22] Filed: Sep. 24, 1985

[30] Foreign Application Priority Data

Oct. 30, 1984 [JP] Japan ................................ 59-229885

[51] Int. Cl.[4] ........................ F02N 15/06; F16H 1/32; F16H 57/10

[52] U.S. Cl. ........................................ 74/7 E; 74/7 A; 74/785; 74/801; 310/83

[58] Field of Search ................. 74/7 A, 7 E, 785, 801; 310/83

[56] References Cited

U.S. PATENT DOCUMENTS 2,303,637 12/1942 Heintz .................................... 74/785
2,679,170 5/1954 Prittie .................................... 74/785
4,192,195 3/1980 Kazino et al. ......................... 74/7 A
4,494,414 1/1985 Hamano ............................. 74/785 X
4,528,470 7/1985 Young et al. ...................... 74/801 X

FOREIGN PATENT DOCUMENTS 50-129811 10/1975 Japan .
2091949 8/1982 United Kingdom .
2108627 5/1983 United Kingdom .

*Primary Examiner*—Allan D. Herrmann
*Attorney, Agent, or Firm*—Cushman, Darby & Cushman

[57] ABSTRACT

A starter for an internal combustion engine comprises a starter motor. A drive shaft extends in coaxial relation to an armature shaft of the starter motor and has a projection extending radially outwardly from an axial end of the drive shaft adjacent the armature shaft. A pinion is in spline engagement with an outer periphery of the drive shaft and in meshing engagement with a ring gear of the engine. The rotation of the armature shaft is reduced in speed and transmitted to the drive shaft through a planetary gear type speed reducing mechanism. A center bracket comprises a cylindrical portion rotatably supported by one of the drive shaft and the armature shaft, and a disc-shaped portion extending radially outwardly from an axial end of the cylindrical portion. A shock absorber unit comprises a rotary disc and a spring disposed around the cylindrical portion of the center bracket. The rotary disc engages an internal gear of the planetary gear type speed reducing mechanism so as not to be rotatable, but to be axially movable with respect to the internal gear. The spring urges the rotary disc against the disc-shaped portion of the center bracket. The rotary disc and spring are retained by a retainer in their respective positions around the cylindrical portion of the center bracket.

12 Claims, 19 Drawing Figures

STARTER WITH PLANETARY GEAR TYPE SPEED REDUCING MECHANISM

BACKGROUND OF THE INVENTION

1. Field of the Invention

This invention relates to a starter having a planetary gear type speed reducing mechanism suitable for use in starting an internal combustion engine.

2. Related Art Statement

One type of starter having a planetary gear type speed reducing mechanism known in the art comprises, as disclosed in Japanese Utility Model Laid-Open No. 50-129811, a spring retained in position between an internal gear and a center bracket by the biasing force of the spring per se.

Because of the arrangement in which the spring is interposed between the internal gear and the center bracket, the starter having the planetary gear type speed reducing mechanism referred to hereinabove has offered the disadvantages that the overall size of the starter becomes large since its axial length is increased by the presence of the spring, and that measurements of the sliding torque are unobtainable until after the spring is fitted in the starter, and it is difficult to set the sliding torque.

OBJECT AND SUMMARY OF THE INVENTION

This invention has as its object the provision of a starter having a planetary gear type speed reducing mechanism, which allows a shock absorber unit to be fitted without increasing the overall size of the starter, and which facilitates the setting of the sliding torque for the shock absorber unit.

According to the present invention, there is provided a starter for an internal combustion engine having a ring gear, the starter comprising: a starter motor having an armature shaft; a drive shaft extending in coaxial relation to the armature shaft, the drive shaft having a projection extending radially outwardly from an axial end of the drive shaft adjacent the armature shaft; a pinion in spline engagement with an outer periphery of the drive shaft and adapted to be in mesh with the ring gear of the internal combustion engine; a planetary gear type speed reducing mechanism comprising a sun gear formed on an outer periphery of an axial end portion of the armature shaft of the starter motor, a plurality of planetary gears rotatably mounted on the projection of the drive shaft so as to be in meshing engagement with the sun gear, and an internal gear disposed radially outwardly of the planetary gears so as to be in meshing engagement with the planetary gears, the planetary gear type speed reducing mechanism being operative to reduce the rotational speed of the armature shaft and transmit the rotation of the armature shaft to the drive shaft through the sun gear, the planetary gears and the internal gear; a center bracket comprising a cylindrical portion supported through a bearing by an outer periphery of one of the drive shaft and the armature shaft, and a disc-shaped portion extending radially outwardly from an axial end of the cylindrical portion; and a shock absorber unit comprising a rotary disc disposed around the cylindrical portion of the center bracket so as not to be rotatable, but to be axially movable with respect to the internal gear, spring means disposed around the cylindrical portion of the center bracket to urge the rotary disc against the disc-shaped portion of the center bracket, and fixing means for retaining the rotary disc and the spring means in their respective positions around the cylindrical portion of the center bracket.

According to the present invention, there is further provided a starter for an internal combustion engine having a ring gear, the starter comprising: a starter motor having an armature shaft; a drive shaft extending in coaxial relation to the armature shaft, the drive shaft having a projection extending radially outwardly from an axial end portion of the drive shaft adjacent the armature shaft; a pinion in spline engagement with an outer periphery of the drive shaft and adapted to be in mesh with the ring gear of the internal combustion engine; a planetary gear type speed reducing mechanism comprising a sun gear formed on an outer periphery of an axial end portion of the armature shaft of the starter motor, a plurality of planetary gears rotatably mounted on the projection of the drive shaft so as to be in meshing engagement with the sun gear, and an internal gear disposed radially outwardly of the planetary gears so as to be in meshing engagement with the planetary gears, the planetary gear type speed reducing mechanism being operative to reduce the rotational speed of the armature shaft and transmit the rotation of the armature shaft to the drive shaft through the sun gear, the planetary gears and the internal gear; a center bracket comprising a first cylindrical portion supported through a bearing by an outer periphery of one of the drive shaft and the armature shaft, a disc-shaped portion extending radially outwardly from an axial end of the first cylindrical portion, and a second cylindrical portion axially extending from an outer peripneral end of the disc-shaped portion with the internal gear being disposed radially inwardly of the second cylindrical portion; and a shock absorber unit comprising a rotary disc disposed around the first cylindrical portion of the center bracket so as not to be rotatable, but to be axially movable with respect to the internal gear, spring means disposed around first cylindrical portion of the center bracket to urge the rotary disc against the disc-shaped portion of the center bracket, and fixing means for retaining the rotary disc and the spring means in their respective positions around the first cylindrical portion of the center bracket.

According to the present invention, there is provided a starter for an internal combustion engine having a ring gear, the starter comprising: a starter motor having an armature shaft; a drive shaft extending in coaxial relation to the armature shaft, the drive shaft having a projection extending radially outwardly from an axial end of the drive shaft adjacent the armature shaft; a pinion in spline engagement with an outer periphery of the drive shaft and adapted to be in mesh with the ring gear of the internal combustion engine; a planetary gear type speed reducing mechanism comprising a sun gear formed on an outer periphery of an axial end portion of the armature shaft of the starter motor, a plurality of planetary gears rotatably mounted on the projection of the drive shaft so as to be in meshing engagement with the sun gear, and an internal gear disposed radially outwardly of the planetary gears so as to be in meshing engagement with the planetary gears, the planetary gear type speed reducing mechanism being operative to reduce the rotational speed of the armature shaft and transmit the rotation of the armature shaft to the drive shaft through the sun gear, the planetary gears and the internal gear; a center bracket comprising a cylindrical portion supported through a bearing by an outer periphery of one of the drive shaft, and the armature shaft and a disc-shaped portion extending radially outwardly from an axial end of the cylindrical portion; a shock absorber unit comprising a rotary disc disposed around the cylindrical portion of the center bracket so as not to be rotatable, but to be axially movable with respect to the internal gear, spring means disposed around the cylindrical portion of the center bracket to urge the rotary disc against the disc-shaped portion of the center bracket, and fixing means for retaining the rotary disc and the spring means in their respective positions around the cylindrical portion of the center bracket; and a shield plate interposed between the shock absorber unit and the planetary gear type speed reducing mechanism and facing to the planetary gear type speed reducing means through a slight gap therebetween.

According to the present invention, there is further provided a starter for an internal combustion engine having a ring gear, the starter comprising: a starter motor having an armature shaft; a drive shaft extending in coaxial relation to the armature shaft, the drive shaft having a projection extending radially outwardly from an axial end of the drive shaft adjacent the armature shaft; a pinion in spline engagement with an outer periphery of the drive shaft and adapted to be in mesh with the ring gear of the internal combustion engine; a planetary gear type speed reducing mechanism comprising a sun gear formed on an outer periphery of an axial end portion of the armature shaft of the starter motor, a plurality of planetary gears rotatably mounted on the projection of the drive shaft so as to be in meshing engagement with the sun gear, and an internal gear disposed radially outwardly of the planetary gears so as to be in meshing engagement therewith, the internal gear having an outer peripheral surface defining a predetermined gap between the internal gear and a member disposed radialy outwardly of the internal gear for fixing the same, the planetary gear type speed reducing mechanism being operative to reduce the rotational speed of the armature shaft and transmit the rotation of the armature shaft to the drive shaft through the sun gear, the planetary gears and the internal gear; a center bracket comprising a cylindrical portion supported through a bearing by an outer periphery of one of the drive shaft and the armature shaft, and a disc-shaped portion extending radially outwardly from an axial end of the cylindrical portion; and a shock absorber unit comprising a rotary disc disposed around the cylindrical portion of the center bracket so as not to be rotatable, but to be axially movable with respect to the internal gear, spring means disposed around the cylindrical portion of the center bracket to urge the rotary disc against the disc-shaped portion of the center bracket, and fixing means for retaining the rotary disc and the spring means in their respective positions around the cylindrical portion of the center bracket.

DETAILED DESCRIPTION OF THE PREFERRED EMBODIMENTS

Figure 1:
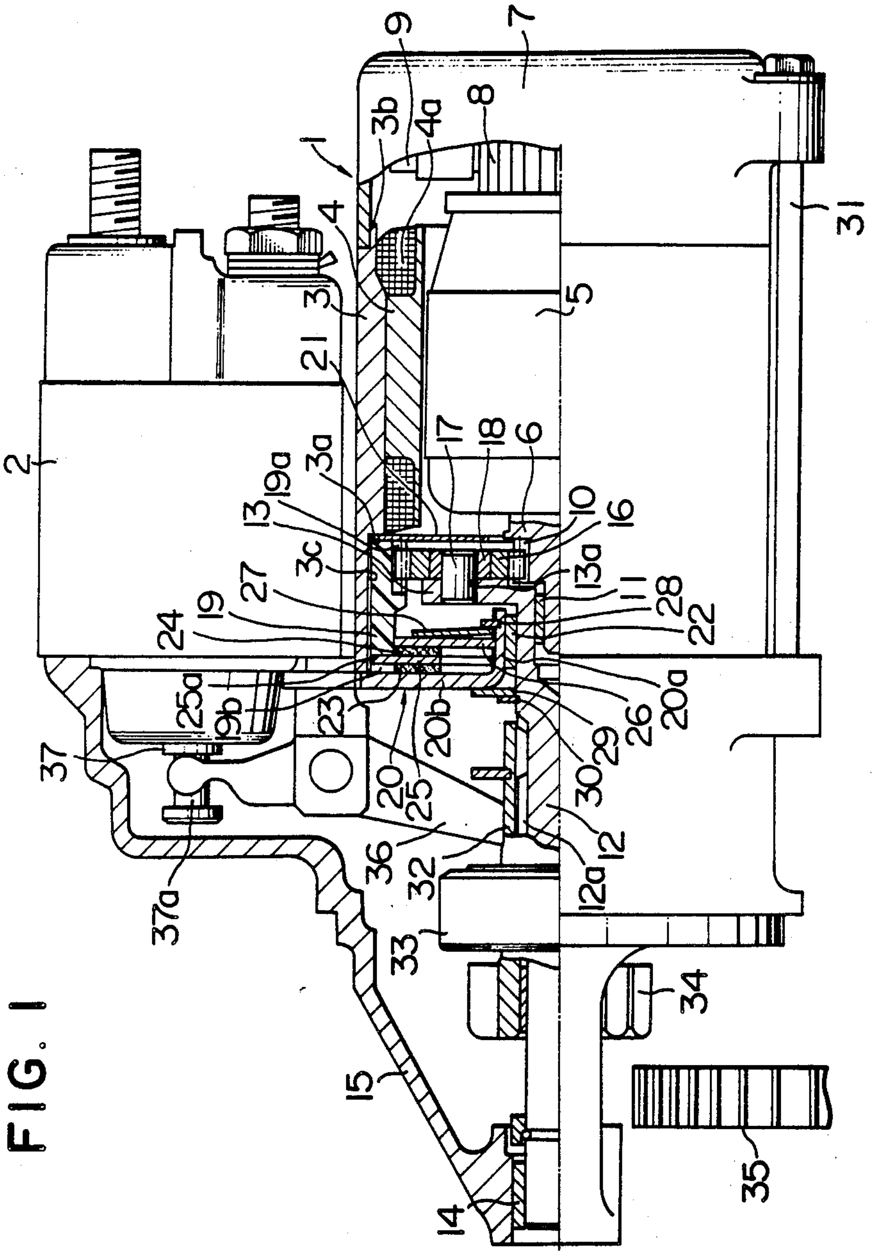
FIG. 1 is a fragmentary cross-sectional view of a starter having a planetary gear type speed reducing mechanism, in accordance with a first embodiment of the invention.

Preferred embodiments of the invention will now be described by referring to the accompanying drawings, in which similar or identical parts or components are throughout designated by like reference characters.

Referring to FIG. 1, there is shown a starter in accordance with a first embodiment of the invention which comprises a starter motor, generally designated by the reference numeral 1, and a magnet switch 2. The starter motor 1 comprises a yoke 3 of substantially cylindrical configuration formed at opposite ends thereof with a first step 3*a* and a second step 3*b* respectively and having an axial end inner peripheral surface portion 3*c* of an increased diameter. Mounted on an inner peripheral surface of the yoke 3 is a pole core 4 having wound therearound a coil 4*a*. An armature 5 mounted in the pole core 4 in concentric relation thereto has an armature shaft 6 extending through a center of the armature 5. The armature shaft 6 is rotatably supported at one end by an end frame 7 and is formed on an outer peripheral surface of an opposite end with a sun gear 10. A brush 9 is disposed in slidable contact with an outer peripheral surface of a commutator 8. A drive shaft 12 is journalled by a bearing 11 coaxially with the armature shaft 6, and formed at one end thereof or on the starter motor 1 side with a disc-shaped projection 13 extending radially outwardly therefrom. The drive shaft 12 is journalled at an opposite end thereof by a bearing 14 mounted on a housing 15. The projection 13 is formed with a plurality of bores 13*a* circumferentially equidistantly spaced from each other. A plurality of planetary gears 16 maintained in meshing engagement with an outer periphery of the sun gear 10 are rotatably retained through respective bearings 18 by respective pins 17 each force fitted in corresponding one of the bores 13*a* formed in the projection 13.

Figure 2:
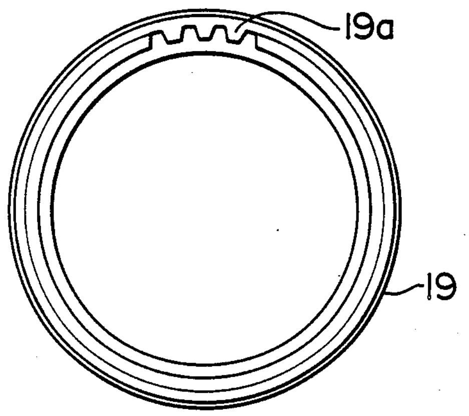
FIG. 2 is a top plan view of an internal gear used in the first embodiment shown in FIG. 1.
Figure 3:
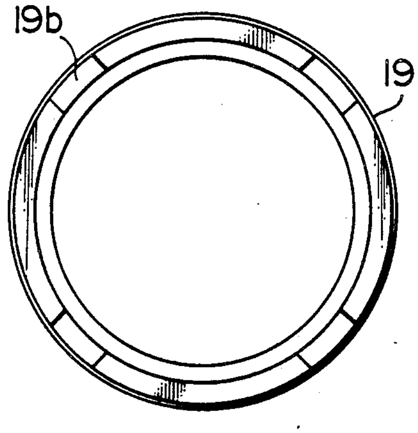
FIG. 3 is a rear plan view of the internal gear shown in FIG. 2.
Figure 4:
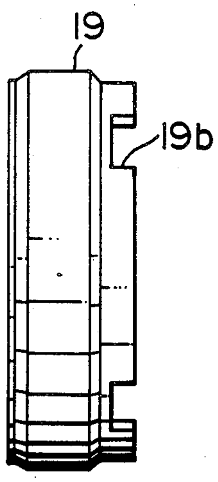
FIG. 4 is a side elevational view of the internal gear shown in FIG. 2.

An internal gear 19 shown in FIGS. 2, 3 and 4 is mounted radially outwardly of the planetary gears 16. The internal gear 19 which is substantially cylindrical in configuration is formed on axial one-half inner peripheral surface portion thereof adjacent the armature 5 with gear teeth 19*a* in mesh with the planetary gears 16 and on an end portion thereof remote from the armature 5 with four cutouts 19*b* spaced circumferentially equidistantly from each other. The internal gear 19 is disposed with a slight gap being defined between an periphery of the internal gear 19 and the inner peripheral surface portion 3*c* of the yoke 3 and is located between a center bracket, generally designated by the reference numeral 20, and the first step 3*a* on the yoke 3. The sun gear 10, planetary gears 16 and internal gear 19 constitute a planetary gear type speed reducing mechanism.

Figure 5:
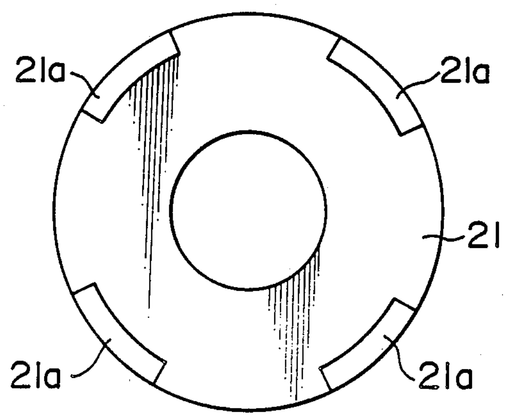
FIG. 5 is a front elevational view of a disc used in the first embodiment shown in FIG. 1.
Figure 6:
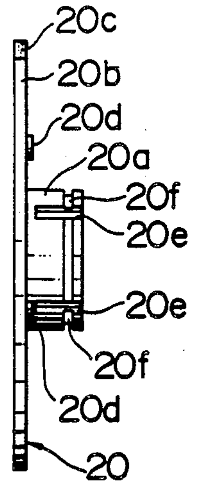
FIG. 6 is a side elevational view of a center bracket used in the first embodiment shown in FIG. 1.
Figure 7:
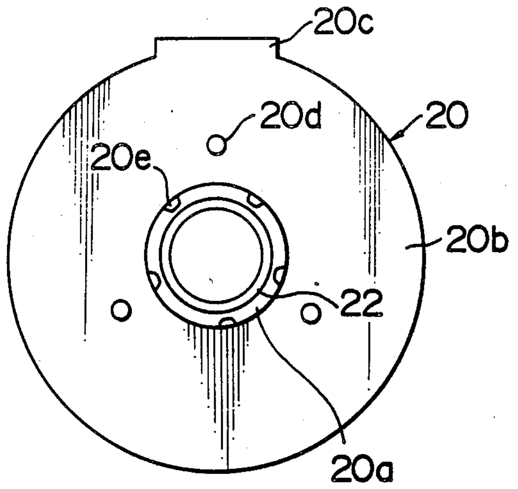
FIG. 7 is a plan view of the center bracket shown in FIG. 5.
Figure 8:
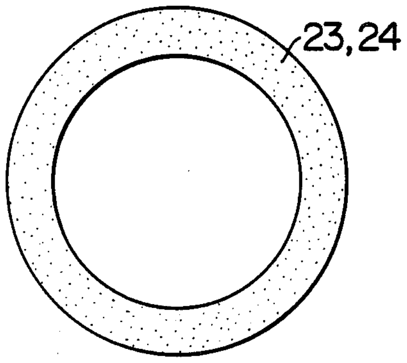
FIG. 8 is a plan view of first and second friction plates used in the first embodiment shown in FIG. 1.
Figure 9:
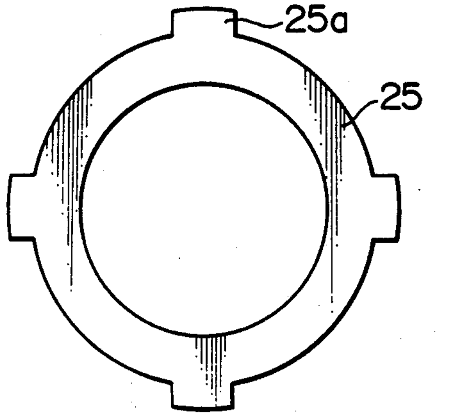
FIG. 9 is a plan view of a rotary disc used in the first embodiment shown in FIG. 1.
Figure 10:
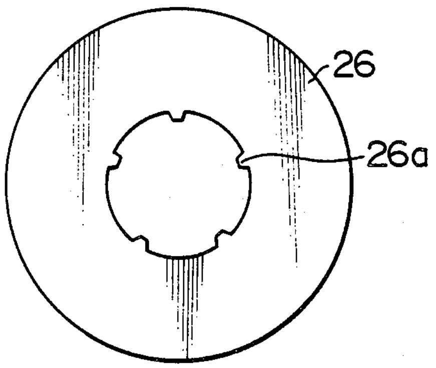
FIG. 10 is a plan view of a stationary disc used in the first embodiment shown in FIG. 1.
Figure 11:
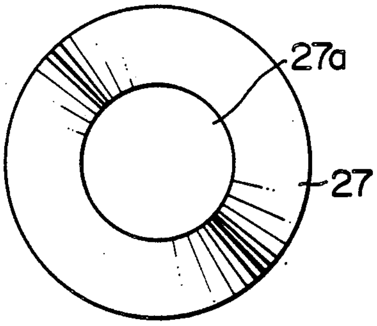
FIG. 11 is a front elevational view of a Belleville spring used in the first embodiment shown in FIG. 1.
Figure 12:
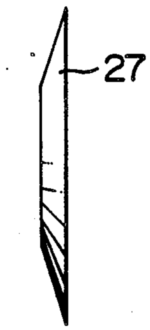
FIG. 12 is a side elevational view of the Belleville spring shown in FIG. 11.

A disc 21 shown in FIG. 5 is positioned between the internal gear 19 and the first step 3*a* on the yoke 3 and is formed on an outer periphery thereof with bent portions 21*a* bent radially inwardly, to assure the location of the internal gear 19 in position by the resilience of the bent portions 21*a*. The disc 21 also performs the function of restricting the axial movement of the planetary gears 16 to prevent the same from coming out of the pins 17. The center bracket 20 comprises, as shown in FIGS. 6 and 7, a cylindrical portion 20*a* journalled by a bearing 22 on an outer periphery of that portion of the drive shaft 12 which is adjacent the projection 13, and a disc-shaped portion 20*b* extending in an integral manner radially outwardly from an end of the cylindrical portion 20*a* which is remote from the projection 13. The disc-shaped portion 20*b* is formed on an outer periphery thereof with a rectangular projection 20*c* for positioning the center bracket 20 with respect to the housing 15. The disc-shaped portion 20*b* is also formed on an axial end face thereof adjacent the cylindrical portion 20*a* with three positioning protuberances 20*d* circumferentially equidistantly spaced from each other. The cylindrical portion 20*a* is formed on an outer periphery thereof with five axial grooves 20*e* circumferentially equidistantly spaced from each other. A second circumferential groove 20*f* is formed on a section of the outer periphery of the cylindrical portion 20*a* adjacent an axial end thereof adjacent the projection 13. First and second friction plates 23 and 24 in the form of a ring, shown in FIG. 8, are disposed with slight clearances being respectively defined between an inner periphery of the internal gear 19 and outer peripheries of the respective friction plates 23 and 24. A rotary disc 25 in the form of a ring and similar in diameter to the friction plates 23 and 24, as shown in FIG. 9, is formed on an outer peripheral surface thereof with four rectangular projections 25*a* circumferentially equidistantly spaced from each other. The four rectangular projections 25*a* are respectively inserted in the four cutouts 19*b* formed in the internal gear 19, so that the rotary disc 25 is movable axially toward the disc-shaped portion 20*b* of the center bracket 20 with respect to the internal gear 19, but is prevented from being rotated relatively to the internal gear 19. A stationary disc 26 in the form of a ring as shown in FIG. 10 is formed on an inner peripheral surface thereof with five projections 26*a* capable of being respectively fitted in the five first grooves 20*e* formed in the cylindrical portion 20*a* of the center bracket 20. Thus, the stationary disc 26 is axially movable, but is prevented from rotating with respect to the center bracket 20. The stationary disc 26 has an outer periphery thereof substantially equal in diameter to the outer circumferential surface of the second friction plate 24. As shown in FIGS. 11 and 12, a Belleville spring 27 has a frusto-conical shape and has formed therein a central opening 27*a* which is fitted on the outer periphery of the cylindrical portion 20*a* of the center bracket 20. A circular clip 28 is inserted in the second groove 20*f* formed in the cylindrical portion 20*a* of the center bracket 20.

The first friction plate 23 is first assembled so as to be into contact with the disc-shaped portion 20*b* of the center bracket 20 and so as to be positioned by the protuberances 20*d* on the disc-shaped portion 20*b*. Subsequently, the rotary disc 25 and the second friction plate 24 are assembled in their respective positions. The projections 26*a* on the rotary disc 26 are then fitted in the respective first grooves 20*e* in the cylindrical portion 20*a* and the rotary disc 26 is caused to abut against the second friction plate 24. The opening 27*a* formed in the Belleville spring 27 then receives therein the cylindrical portion 20*a* and an outer peripheral end portion of the Belleville spring 27 is caused to abut against the stationary disc 26. The Beleville spring 27 is then flexed, and the circular clip 28 is caused to abut against an innter peripheral end portion of the Belleville spring 27. The circular clip 28 is then fitted in the second groove 20*f*. Thus, the circular clip 28 serves as fixing means for restricting the axial movement of the Belleville spring 27. Accordingly, the biasing force of the Belleville spring 27 allows the first friction plate 23 to be urged against the disc-shaped portion 20*b* of the center bracket 20 through the stationary disc 26, second friction plate 24 and rotary disc 25. Thus, a predetermined torque is set by the frictional drag or force between the first friction plate 23 and the disc-shaped portion 20*b* of the center bracket 20, the frictional drag between the first frictional plate 23 and the rotary disc 25, the frictional drag between the second frictional plate 24 and the rotary disc 25 and the frictional drag between the second frictional plate 24 and the stationary disc 26. The first friction plate 23, rotary disc 25, second friction plate 24 and stationary disc 25 are retained in unit on the outer periphery of the cylindrical portion 20*a* of the center bracket 20 by the biasing force of the Belleville spring 27. The first friction plate 23, rotary disc 25, second friction plate 24, stationary disc 26 and Belleville spring 27 constitute a shock absorber unit. A washer 29 and a circular clip 30 restrict the axial movement of the center bracket 20. When the end frame 7 is secured to the housing 15 by through bolts 31, the outer peripheral end of the disc-shaped portion 20*b* of the center bracket 20 is held between the housing 15 and the yoke 3 to secure the center bracket 20 in position, and the internal gear 19 is held between the center bracket 20 and the first step 3*a* on the yoke 3 so as to be secured in position. The rotary disc 25 which is assembled with the center bracket 20 has the projections 25*a* respectively fitted in the cutouts 19*b* in the internal gear 19. Thus, the center bracket 20 rotatably supports the drive shaft 12 through the bearing 22. A spline tube 32 is in spline-engagement with a helical spline 12*a* on the drive shaft 12 and is connected to a pinion 34 through a unidirectional clutch 33. A ring gear 35 is in mesh with the pinion 34 to start the internal combustion engine. A lever 36 engages at U-shaped one end thereof an outer periphery of the spline tube 32 and engages at the other end a joint 37*a* of a plunger 37 of the magnet switch 2.

Operation of the starter of the aforesaid construction will now be described. As the magnet switch 2 is turned on, the plunger 37 is attracted, and the lever 36 engaging the joint 37*a* is pulled toward the magnet switch 2 and angularly moves. The angular or pivotal movement of the lever 36 causes, via the spline tube 32 and unidirectional clutch 33, the pinion 34 to be moved forwardly (to the left in FIG. 1). As the pinion 34 is brought into contact with the ring gear 35, the magnet swtich 2 has its contact closed, to allow a current to pass through the coil 4*a* of the starter motor 1. The energization of the coil 4*a* produces a magnetic flux which rotates the armature 5. The rotation of the armature 5 is transmitted to the planetary gears 16 via the sun gear 10. When the rotary torque is below a predetermined value, the internal gear 19 is prevented from rotating by the rotary disc 25 which is urged by the Belleville spring 27 against the disc-shaped portion 20*b* of the center bracket 20. Thus, the rotation of the armature shaft 6 is reduced in speed and is transmitted to the drive shaft 12 by the planetary gears 16 meshing with the sun gear 10 and the teeth 19*a* of the internal gear 19. The reduced rotational speed is transmitted to the pinion 34 through the spline tube 32 and unidirectional clutch 33. The rotation of the pinion 34 is transmitted to the ring gear 35, to thereby start the internal combustion engine.

However, in the event that a torque higher than the predetermined value is applied when the pinion 34 is brought into meshing engagement with the ring gear 35, such as when the rotating pinion 34 is again brought into meshing engagement with the ring gear 35 to thereby produce an overload condition, the rotary torque is transmitted to the rotary disc 25 through the pinion 34, planetary gears and internal gear 19, and then a slip is caused to take place between the first friction plate 23 and the disc-shaped portion 20*b* of the center bracket 20, between the first friction plate 23 and rotary disc 25, between the second friction plate 24 and rotary disc 25 and/or between the second friction plate 24 and stationary disc 26, thereby causing the rotary disc 25 to rotate. This allows the internal gear 19, which has been prevented from rotating by the rotary disc 25, to be rotated by the rotary disc 25. Thus, a torque higher than the predetermined value is prevented from being applied to a rotation transmitting path from the armature 5 to the pinion 34.

The shock absorber unit is thus conveniently disposed in a space around the outer periphery of the cylindrical portion 20*a* of the center bracket 20 which supports rotatably the drive shaft 12. This makes it possible to mount the shock absorber unit without increasing the axial dimension of the starter.

The shock absorber unit mounted in the space around the outer periphery of the cylindrical portion 20*a* of the center bracket 20 is formed into a unitary structure which is located at the outer periphery of the drive shaft 12. This enables the slip torque of the shock absorber unit to be set before the unit is actually mounted to the starter. Specifically, the slip torque may be measured in such a manner that with the center bracket 20 being fixed, a rotational force is applied to a cylindrical ring which is similar in configuration to the internal gear 19 and which is formed with cutouts adapted to respectively receive the projections 25*a* on the rotary disc 25. In the event that the slip torque has a value which is different from a desired setting value, the Belleville spring 27 may be replaced by another Belleville spring having a predetermined load, or one or more washer may be inserted between the Belleville spring 27 and the circular clip 28, to thereby increase the load of the Belleville spring 27 to increase the slip torque.

As described hereinabove, the shock absorber unit is mounted around the cylindrical portion 20*a* of the center bracket 20 as a unitary structure. This makes it possible to utilize the same components for a planetary gear type speed reducing mechanism having a different speed reduction ratio (in which the internal gear 19 is to be replaced by another one having a different number of teeth 19*a*, for example). Thus, the need to use different shock absorber devices for planetary gear type speed reducing mechanisms of different reduction ratios is eliminated.

The shock absorber unit is located at the side of the planetary gear type speed reducing mechanism adjacent the pinion 34. This structural arrangement offers the advantage that the shock absorber unit can be prevented from being influenced by the heat generated by the starter motor 1.

Figure 13:
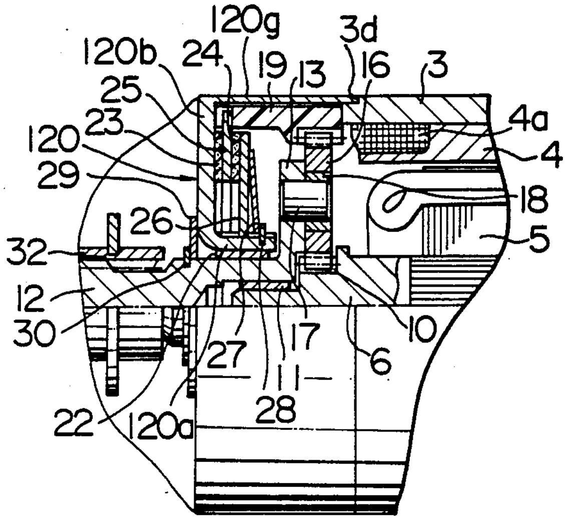
FIG. 13 is a fragmentary cross-sectional view of essential portions of a starter having a planetary gear type speed reducing mechanism, in accordance with a second embodiment of the invention.

FIG. 13 shows a second embodiment in which a center bracket 120 comprises a first cylindrical portion 120*a* journalled by the bearing 22 on the outer periphery of the drive shaft 12, a disc-shaped portion 120*b* extending radially outwardly from an axial end of the first cylindrical portion 120*a* opposite the planetary gear type speed reducing mechanism, and a second cylindrical portion 120*g* bent at a right angle from the outer periphery of the disc-shaped portion 120*b* and extending parallel to the first cylindrical portion 120*a*. The internal gear 19 is mounted within the second cylindrical portion 120*g*. The second cylindrical portion 120*g* is held at opposite ends by the housing 15 and a step 3*d* on the outer periphery of the yoke 3, to fix the center bracket 120 in position. It is of course that the center bracket 120 has a rectangular portion, protuberances, axial grooves and a circumferential groove respectively corresponding to those designated by the reference numerals 20*c*, 20*d*, 20*e*, and 20*f* in FIG. 6.

In addition to the advantages offered by the first embodiment shown in FIGS. 1–12 and described hereinabove, the following advantages are offered by the second embodiment shown in FIG. 13. The provision of the second cylindrical portion 120*g* can prevent splashed water from entering the first and second friction plates 23 and 24 through an opening in the housing 15 at which the pinion 34 meshes with the ring gear 35. Thus, it is possible to avoid the trouble that the water adhering to the first and second friction plates 23 and 24 might reduce the coefficient of friction of their respective outer peripheries and decrease the transmission torque, thereby making it impossible to transmit a drive force from the starter motor 1 (FIG. 1) to the pinion 34 (FIG. 1). Also, it is possible to avoid the trouble that the water adhering to the first and second friction plates 23 and 24 might cause rust formation to occur thereon and increase the coefficient of friction and the torque of impact, thereby damaging the rotation transmitting path.

Figure 14:
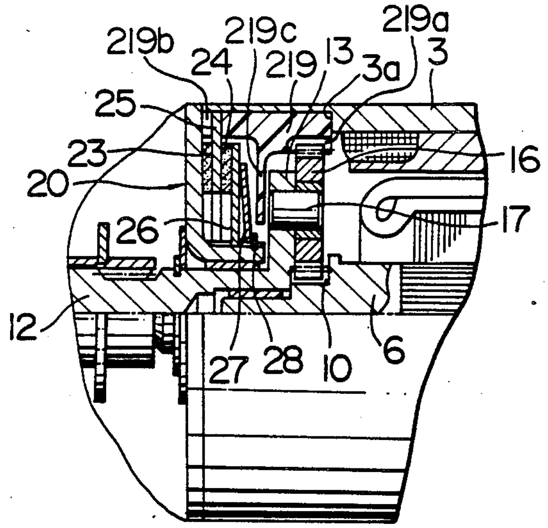
FIG. 14 is a fragmentary cross-sectional view of essential portions of a starter having a planetary gear type speed reducing mechanism, in accordance with a third embodiment of the invention.

FIG. 14 shows a third embodiment in which an internal gear 219 is integrally formed on an inner peripheral surface thereof with a projection 219*c*, serving as a shield plate, which extends radially inwardly and faces to an end surface of the projection 13 on the drive shaft 12 adjacent the center bracket 20 with a slight axial gap being defined between the projections 219*c* and 13. It is of course that the internal gear 219 has gear teeth and cutouts respectively corresponding to those designated by the reference numerals 19*a* and 19*b* shown in FIGS. 2 to 4.

In addition to the advantages offered by the first embodiment, the following advantages are offered by the third embodiment. Even if grease for providing lubrication contained in the planetary gear type speed reducing mechanism scatters, the provision of the projection 219*c* prevents the grease from entering the shock absorber unit. Thus, it is possible to avoid the trouble that the grease would adhere to the first and second friction plates 23 and 24 to reduce the slip torque of the shock absorber unit, thereby making it impossible to transmit the drive force of the starter motor 1 (FIG. 1) to the pinion 34 (FIG. 1)

Figure 15:
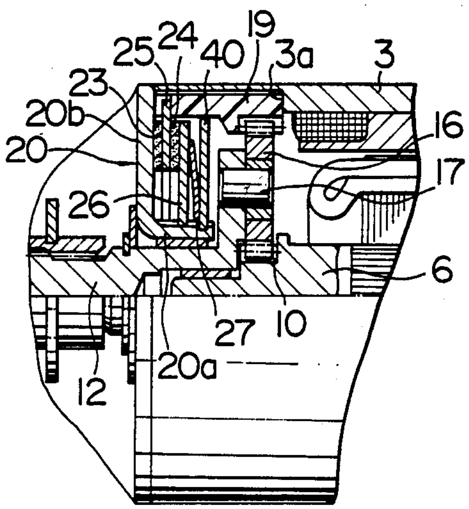
FIG. 15 is a fragmentary cross-sectional view of essential portions of a modification of the third embodiment shown in FIG. 14.

Although the projection 219*c* has been described as being formed on the inner periphery of the internal gear 219 in the third embodiment, the projection 219*c* may be replaced by a shield plate 40 of an annular shape secured to an axial end of the cylindrical portion 20*a* of the center bracket 20 adjacent the planetary gear 16, as shown in FIG. 15. The shield plate 40 has an outer periphery thereof which faces to an inner periphery of the internal gear 19 with a slight radial gap being defined between the shield plate 40 and the internal gear 19. An inner periphery of the shield plate 40 is fixed along the second groove 20*f* in the cylindrical portion 20*a* of the center bracket 20. The shield plate 40 also performs the function of restricting the axial movement of the Belleville spring 27 in place of the circular clip 28 shown in FIG. 14.

Figure 16:
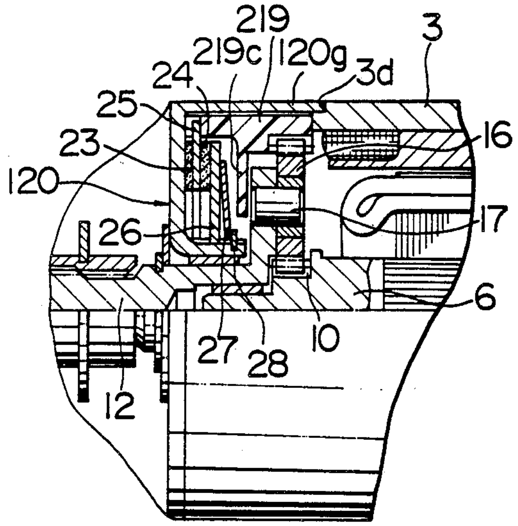
FIG. 16 is a fragmentary cross-sectional view of essential portions of a starter having a planetary gear type speed reducing mechanism, in accordance with a fourth embodiment of the invention.

FIG. 16 shows a fourth embodiment in which the second cylindrical portion 120*g* is formed on the center bracket 120 as is the case with the second embodiment shown in FIG. 13 and the projection 219*c* is formed on the inner periphery of the internal gear 219 as is the case with the third embodiment shown in FIG. 14.

Figure 17:
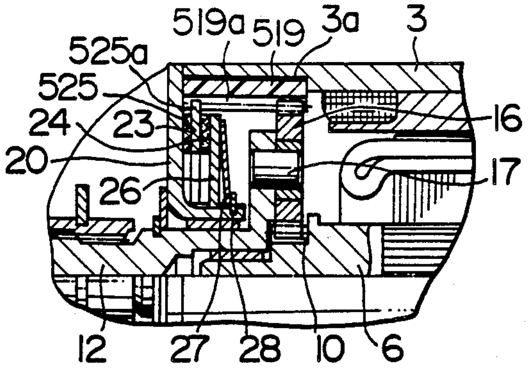
FIG. 17 is a fragmentary cross-sectional view of essential portions of a starter having a planetary gear type speed reducing mechanism, in accordance with a fifth embodiment of the invention.

FIG. 17 shows a fifth embodiment in which an internal gear 519 is formed on the entire inner peripheral surface thereof with teeth 519*a*. A rotary disc 525 has an outer peripheral portion 525*a* thereof configured so as to be fitted on respective teeth 519*a* on the internal gear 519.

The embodiment shown in FIG. 17 offers the advantages, in addition to the advantages offered by the first embodiment, that fabrication of the internal gear 519 is facilitated because the teeth 519*a* are formed so as to extend over the entire inner peripheral surface of the internal gear 519, and that the internal gear 519 may be inserted from either direction, to thereby improve assembling operability.

Figure 18:
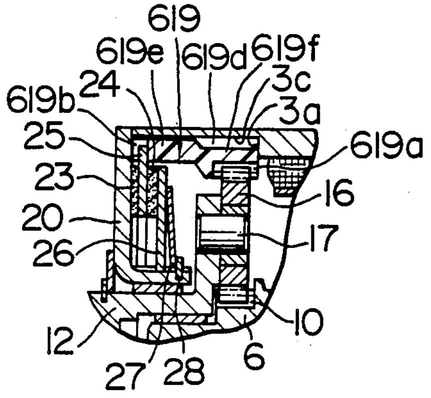
FIG. 18 is a fragmentary cross-sectional view of essential portions of a starter having a planetary gear type speed reducing mechanism, in accordance with a sixth embodiment of the invention.

FIG. 18 shows a sixth embodiment in which an annular or circumferential recess 619*d* is formed on an outer peripheral portion of an internal gear 619 formed of synthetic resinous material, which is opposite an inner peripheral surface portion thereof having formed thereon with teeth 619*a*. The internal gear 619 comprises a major diameter portion 619*e* facing to the inner peripheral surface portion 3*c* of the yoke 3 with a slight gap being defined therebetween, and a minor diameter portion 619*f* facing to the inner peripheral surface portion 3*c* of the yoke 3 with the annular recess 619*d* being positioned therebetween. The major diameter portion 619*e* performs the function of centering the internal gear 619, and the annular recess 619*d* has the function of allowing elastic deformation of the internal gear 619 formed of synthetic resinous material. Thus, it is possible to avoid the trouble that the elastic deformation of the internal gear 619 might bring the outer periphery of the internal gear 619 into contact with the inner peripheral surface portion 3*c* of the yoke 3, thereby making it impossible for the internal gear 19 to rotate.

Figure 19:
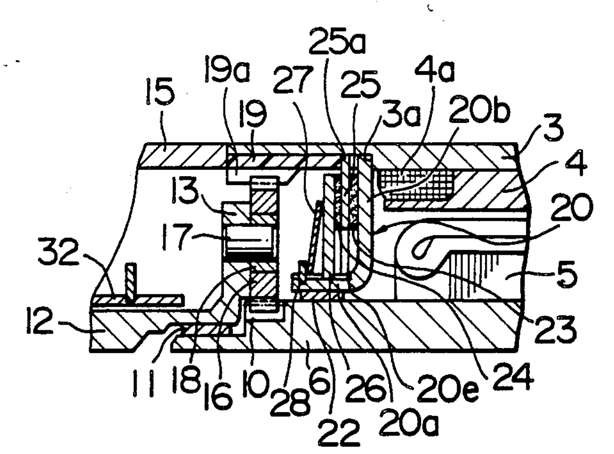
FIG. 19 is a fragmentary cross-sectional view of essential portions of a starter having a planetary gear type speed reducing mechanism, in accordance with a seventh embodiment of the invention.

In the seventh embodiment shown in FIG. 19, the center bracket 20 is located at the side adjacent the armature 5 with respect to the planetary gear type speed reducing mechanism. The center bracket 20 supports the armature shaft 6 through the bearing 22, and the armature shaft 6 supports the drive shaft 12 through the bearing 11. The center bracket 20 is held and fixed between the internal gear 19 and the first step 3*a* on the yoke 3.

By this structural arrangement shown in FIG. 19, the shock absorber unit can be conveniently fitted around the outer periphery of the cylindrical portion 20*a* of the center bracket 20 supporting the drive shaft 12. Thus, the shock absorber unit can be mounted without increasing the axial dimension of the starter. The arrangement whereby the shock absorber unit constructed as a unitary structure located around the outer periphery of the cylindrical portion 20*a* of the center bracket 20 is mounted around the outer periphery of the armature shaft 6 enables the slip torque of the shock absorber unit to be set before it is assembled with the starter. The slip torque may be measured by fixing the center bracket 20 in position and exerting a rotational force on a cylindrical ring which has the same configuration as the internal gear 19 and which is formed with cutouts adapted to receive the respective projections 25*a* on the rotary disc 25.

In the embodiments shown in FIGS. 1–19, if the rotay disc 25, 525 is formed of material of high frictional resistance, the rotary disc may directly abut against the disc-shaped portion, 20*b*, 120*b* of the center bracket 20, 120 and be urged by the Belleville spring 27 against the center bracket 20, 120. The Belleville spring 27 may be fitted on the outer periphery of the cylindrical porti120*a* of the center bracket 20, 120 by staking, welding or the like. This would offer the advantage, in addition to the advantages described with reference to the first embodiment, that the need to use the first and second friction plates 23 and 24 and stationary disc 26 is eliminated, thereby reducing the number of components and production costs.

The circular clip 28 has been described as being utilized to restrict the axial movement of the Belleville spring 27. However, in place of the circular clip 28, the Belleville spring 27 may be staked to the cylindrical portion 20*a*, 120*a* of the center bracket 20, 120 to restrict the axial movement of the spring 27.

The Belleville spring 27 may be replaced by a coil spring which is disposed around the outer periphery of the cylindrical portion 20*a*, 120*a* of the center bracket 20, 120.

The projections 26*a* have been described as being formed on the inner periphery of the stationary disc 26 and fitted in the respective first grooves 20*e* formed in the cylindrical portion 20*a*, 120*a* of the center bracket 20, 120. However, grooves may be formed at the inner periphery of the stationary disc 26, and projections may be formed on the outer periphery of the cylindrical portion 20*a*, 120*a* of the center bracket 20, 120 and respectively fitted in the grooves in the stationary disc 26.

From the foregoing description, it will be evident that the invention offers significant advantages. In the invention, the shock absorber unit is assembled with the starter by utilizing the space around the outer periphery of the cylindrical portion of the center bracket. This structural arrangement makes it possible to mount the shock absorber unit without increasing the overall axial length of the starter. The use of fixing means for retaining the shock absorber unit around the outer periphery of the cylindrical portion of the center bracket makes it possible to set the slip torque of the shock absorber unit before the shock absorber unit is assembled with the starter, thereby facilitating the slip torque setting operation.

The invention offers, in addition to the advantages described hereinabove, the advantage that the provision of the second cylindrical portion of the center bracket located around the outer periphery of the internal gear is conducive to prevention of the entry of splashed water from outside into the shock absorber unit.

The invention offers, in addition to the advantages described hereinabove, the advantage that the provision of the shield plate located between the spring and the planetary gear type speed reducing mechanism is conducive to prevention of grease within the planetary gear type speed reducing mechanism from entering the shock absorber unit when the grease might be scattered by some accident.

The invention offers, in addition to the advantages described hereinabove, the advantage that the provision of the predetermined radial gap between the outer periphery of the internal gear and a member to which the internal gear is affixed makes it possible to avoid the trouble that elastic deformation of the internal gear might render the internal gear unrotatable due to the contact of the outer periphery of the internal gear with the member to which it is affixed.

What is claimed is:

1. A starter for an internal combustion engine having a ring gear, the starter comprising:

a starter motor having an armature shaft;

a drive shaft extending in coaxial relation to said armature shaft, said drive shaft having a projection extending radially outwardly from an axial end of said drive shaft adjacent said armature shaft;

a pinion in spline engagement with an outer periphery of said drive shaft and adapted to be in mesh with the ring gear of the internal combustion engine;

a planetary gear type speed reducing mechanism comprising a sun gear formed on an outer periphery of an axial end portion of said armature shaft of said starter motor, a plurality of planetary gears rotatably mounted on said projection of said drive shaft so as to be in meshing engagement with said sun gear, and an internal gear disposed radially outwardly of said planetary gears so as to be in meshing engagement with said planetary gears, said planetary gear type speed reducing mechanism being operative to reduce the rotational speed of said armature shaft and transmit the rotation of said armature shaft to said drive shaft through said sun gear, said planetary gears and said internal gear;

a center bracket comprising a cylindrical portion supported through a bearing by an outer periphery of one of said drive shaft and said armature shaft, and a disc-shaped portion extending radially outwardly from an axial end of said cylindrical portion; and a shock absorber unit comprising a rotary disc disposed around said cylindrical portion of said center bracket so as not to be rotatable, but to be axially movable with respect to said internal gear, spring means disposed around said cylindrical portion of said center bracket to urge said rotary disc against said disc-shaped portion of said center bracket, and fixing means for retaining said rotary disc and said spring means in their respective positions around said cylidrical portion of said center bracket.

2. A starter as claimed in claim 1, wherein said internal gear has formed therein an axial cutout, and said rotary disc has formed thereon a projections adapted to be fitted in said cutout in said internal gear.

3. A starter as claimed in claim 1, wherein said center bracket is fixed with an outer periphery of said disc-shaped portion thereof being held between a housing and a yoke of said starter motor.

4. A starter as claimed in claim 1, wherein said fixing means of said shock absorber unit comprises a circular clip fitted in a circumferential groove formed in an outer periphery of said cylidrical portion of said center bracket.

5. A starter as claimed in claim 1, wherein said spring means comprises a Belleville spring.

6. A starter as claimed in claim 1, wherein said shock absorber unit includes a stationary disc interposed between said spring means and said rotary disc, said stationary disc being in recess-projection interfitting engagement with an outer periphery of said cylindrical portion of said center bracket so as not to be rotatable with respect to said center bracket.

7. A starter as claimed in claim 6, wherein said shock absorber unit includes a first friction plate interposed between said rotary disc and said disc-shaped portion of said center bracket, and a second friction plate interposed between said rotary disc and said stationary disc.

8. A starter as claimed in claim 1, wherein said internal gear is formed with teeth meshing with said planetary gears, said teeth extending over the entire inner peripheral surface of said internal gear, said rotary disc having an outer peripheral surface thereof so configured as to mesh with said teeth.

9. A starter for an internal combustion engine having a ring gear, the starter comprising:

a starter motor having an armature shaft;

a drive shaft extending in coaxial relation to said armature shaft, said drive shaft having a projection extending radially outwardly from an axial end portion of said drive shaft adjacent said armature shaft;

a pinion in spline engagement with an outer periphery of said drive shaft and adapted to be in mesh with the ring gear of the internal combustion engine;

a planetary gear type speed reducing mechanism comprising a sun gear formed on an outer periphery of an axial end portion of said armature shaft of said starter motor, a plurality of planetary gears rotatably mounted on said projection of the drive shaft so as to be in meshing engagement with said sun gear, and an internal gear disposed radially outwardly of said planetary gears so as to be in meshing engagement with said planetary gears, said planetary gear type speed reducing mechanism being operative to reduce the rotational speed of said armature shaft and transmit the rotation of said armature shaft to said drive shaft through said sun gear, said planetary gears and said internal gear;

a center bracket comprising a first cylindrical portion supported through a bearing by an outer periphery of one of said drive shaft and said armature shaft, a disc-shaped portion extending radially outwardly from an axial end of said first cylindrical portion, and a second cylindrical portion axially extending from an outer peripheral end of said disc-shaped portion with said internal gear being disposed radially inwardly of said second cylindrical portion; and a shock absorber unit comprising a rotary disc disposed around said first cylindrical portion of said center bracket so as not to be rotatable, but to be axially movable with respect to said internal gear, spring means disposed around said first cylindrical portion of said center bracket to urge said rotary disc against said disc-shaped portion of said center bracket, and fixing means for retaining said rotary disc and said spring means in their respective positions around said first cylindrical portion of said center bracket.

10. A starter for an internal combustion engine having a ring gear, the starter comprising:

a starter motor having an armature shaft;

a drive shaft extending in coaxial relation to said armature shaft, said drive shaft having a projection extending radially outwardly from an axial end of said drive shaft adjacent said armature shaft;

a pinion in spline engagement with an outer periphery of said drive shaft and adapted to be in mesh with the ring gear of the internal combustion engine;

a planetary gear type speed reducing mechanism comprising a sun gear formed on an outer periphery of an axial end portion of said armature shaft of said starter motor, a plurality of planetary gears rotatably mounted on said projection of the drive shaft so as to be in meshing engagement with said sun gear, and an internal gear disposed radially outwardly of said planetary gears so as to be in meshing engagement with said planetary gears, said planetary gear type speed reducing mechanism being operative to reduce the rotational speed of said armature shaft and transmit the rotation of said armature shaft to said drive shaft through said sun gear, said planetary gears and said internal gear;

a center bracket comprising a cylindrical portion supported through a bearing by an outer periphery of one of said drive shaft and said armature shaft, and a disc-shaped portion extending radially outwardly from an axial end of said cylindrical portion;

a shock absorber unit comprising a rotary disc disposed around said cylindrical portion of said center bracket so as not to be rotatable, but to be axially movable with respect to said internal gear, spring means disposed around said cylindrical portion of said center bracket to urge said rotary disc against said disc-shaped portion of said center bracket, and fixing means for retaining said rotary disc and said spring means in their respective positions around said cylindrical portion of said center bracket; and a shield plate interposed between said shock absorber unit and said planetary gear type speed reducing mechanism and facing to said planetary gear type speed reducing means through a slight gap therebetween.

11. A starter as claimed in claim 10, wherein said shield plate comprises a projection integrally extending from an inner periphery of said internal gear, said projection facing to an end face of said projection on said drive shaft with a slight gap being defined therebetween.

12. A starter for an internal combustion engine having a ring gear, the starter comprising:

a starter motor having an armature shaft;

a drive shaft extending in coaxial relation to said armature shaft, said drive shaft having a projection extending radially outwardly from an axial end of said drive shaft adjacent said armature shaft;

a pinion in spline engagement with an outer periphery of said drive shaft and adapted to be in mesh with the ring gear of the internal combustion engine;

a planetary gear type speed reducing mechanism comprising a sun gear formed on an outer periphery of an axial end portion of said armature shaft of said starter motor, a plurality of planetary gears rotatably mounted on said projection of said drive shaft so as to be in meshing engagement with said sun gear, and an internal gear disposed radially outwardly of said planetary gears so as to be in meshing engagement therewith, said internal gear having an outer peripheral surface defining a predetermined gap between said internal gear and a member disposed radially outwardly of said internal gear for fixing the same, said planetary gear type speed reducing mechanism being operative to reduce the rotational speed of said armature shaft and transmit the rotation of said armature shaft to said drive shaft through said sun gear, said planetary gears and said internal gear;

a center bracket comprising a cylindrical portion supported through a bearing by an outer periphery of one of said drive shaft and said armature shaft, and a disc-shaped portion extending radially outwardly from an axial end of said cylindrical portion; and a shock absorber unit comprising a rotary disc disposed around said cylindrical portion of said center bracket so as not to be rotatable, but to be axially movable with respect to said internal gear, spring means disposed around said cylindrical portion of said center bracket to urge said rotary disc against said disc-portion of said center bracket, and fixing means for retaining said rotary disc and said spring means in their respective positions around said cylindrical portion of said center bracket.

* * * * *